(12) United States Patent
Varnoux et al.

(10) Patent No.: US 9,709,096 B2
(45) Date of Patent: Jul. 18, 2017

(54) CAGE FOR A ROLLING BEARING, NOTABLY FOR A MOTOR VEHICLE ELECTRIC POWER STEERING BEARING

(71) Applicants: Laurent Varnoux, Saint-avertin (FR); Thierry Adane, Tours (FR); Thomas Perrotin, Saint Roch (FR)

(72) Inventors: Laurent Varnoux, Saint-avertin (FR); Thierry Adane, Tours (FR); Thomas Perrotin, Saint Roch (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/763,281

(22) PCT Filed: Jan. 23, 2014

(86) PCT No.: PCT/EP2014/051283
§ 371 (c)(1),
(2) Date: Jul. 24, 2015

(87) PCT Pub. No.: WO2014/114692
PCT Pub. Date: Jul. 31, 2014

(65) Prior Publication Data
US 2015/0354630 A1    Dec. 10, 2015

(30) Foreign Application Priority Data
Jan. 25, 2013  (FR) ..................... 13 50660

(51) Int. Cl.
*F16C 33/38*  (2006.01)
*F16C 33/41*  (2006.01)
*F16C 19/06*  (2006.01)

(52) U.S. Cl.
CPC ........ *F16C 33/3887* (2013.01); *F16C 33/416* (2013.01); *F16C 33/418* (2013.01); *F16C 19/06* (2013.01); *F16C 2326/24* (2013.01)

(58) Field of Classification Search
CPC .... F16C 33/38; F16C 33/3812; F16C 33/414; F16C 33/416; F16C 33/418; F16C 33/3887; F16C 19/06; F16C 2326/24
See application file for complete search history.

(56) References Cited

U.S. PATENT DOCUMENTS 1,654,101 A * 12/1927 Styri ................. F16C 33/41
384/525
4,111,501 A *  9/1978 Johnston ............. B60B 27/0005
384/526

(Continued)

FOREIGN PATENT DOCUMENTS

DE       9401253 U1   3/1994
FR        371154 A    2/1907
(Continued)

*Primary Examiner* — Alan B Waits
(74) *Attorney, Agent, or Firm* — Bryan Peckjian; SKF USA Inc. Patent Dept.

(57) ABSTRACT

A cage for a rolling bearing, wherein the cage is intended to ensure the circumferential spacing of a row of rolling elements. The cage comprises pockets for the rolling elements and connecting portions, each connecting portion connecting two successive pockets. At least one of the connecting portions is elastically deformable at least in a circumferential direction so as to allow the two associated pockets to move relative to one another in the circumferential direction.

12 Claims, 2 Drawing Sheets

(56) References Cited

U.S. PATENT DOCUMENTS

| | | | | |
|---|---|---|---|---|
| 4,235,487 A * | 11/1980 | Schard | ............... | F16C 19/463 |
| | | | | 384/576 |
| 5,044,787 A * | 9/1991 | Hupfer | ............... | F16C 33/4694 |
| | | | | 384/572 |
| 5,957,592 A * | 9/1999 | Yamanaka | ............ | B62K 19/34 |
| | | | | 384/526 |
| 6,092,634 A * | 7/2000 | Kremer | ............... | F16C 33/46 |
| | | | | 192/38 |
| 6,116,783 A * | 9/2000 | Shirai | ............... | F16C 29/0657 |
| | | | | 384/43 |
| 6,692,393 B2 * | 2/2004 | Fukuwaka | ........... | F16C 33/416 |
| | | | | 474/135 |
| 6,843,604 B2 * | 1/2005 | Hiramatsu | ........... | F16C 19/163 |
| | | | | 384/450 |
| 9,057,404 B2 * | 6/2015 | Adane | ............... | F16C 33/3887 |
| 2012/0024618 A1 * | 2/2012 | Houdayer | ........... | B62D 5/0448 |
| | | | | 180/447 |
| 2016/0003297 A1 * | 1/2016 | Varnoux | ............. | F16C 33/416 |
| | | | | 384/531 |

FOREIGN PATENT DOCUMENTS

| | | |
|---|---|---|
| FR | 2883941 A1 | 10/2006 |
| FR | 2911934 A1 | 8/2008 |

* cited by examiner

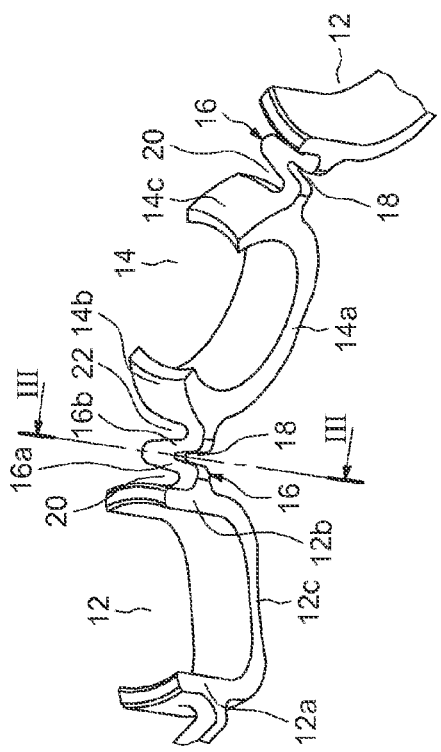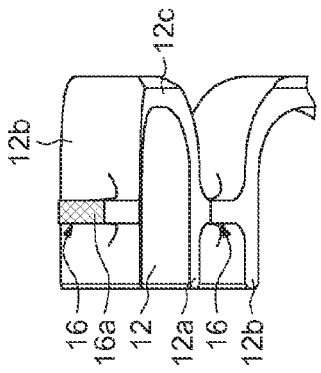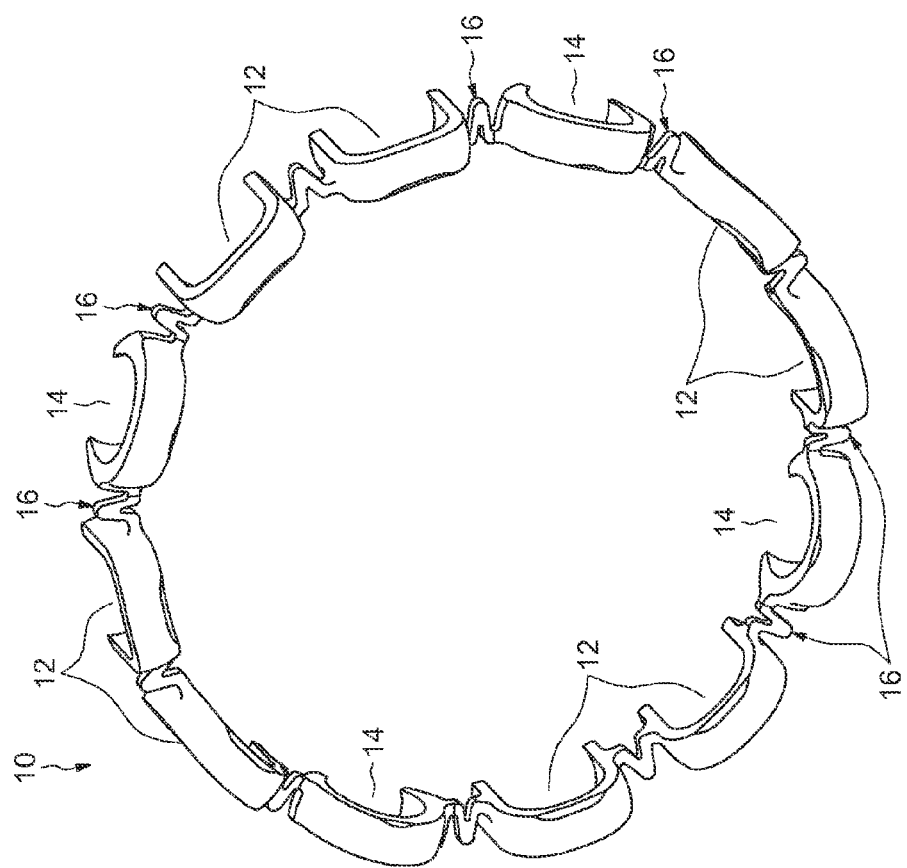

CAGE FOR A ROLLING BEARING, NOTABLY FOR A MOTOR VEHICLE ELECTRIC POWER STEERING BEARING

CROSS REFERENCE TO RELATED APPLICATIONS

This is a United States National Stage Application claiming the benefit of International Application Number PCT/EP2014/051283 filed on 23 Jan. 2014 (23.01.2014), which claims the benefit of French Application Serial Number 1350660, filed on 25 Jan. 2013 (25.01.2013), both of which are incorporated herein by reference in their entireties.

FIELD OF THE INVENTION

The present invention relates to the field of rolling bearings, notably the rolling bearings used in motor vehicle electric power steerings. More specifically, the invention relates to the retention cages which ensure a circumferential spacing between the rolling elements of the rolling bearings.

BACKGROUND OF THE PRESENT INVENTION

A motor vehicle electric power steering generally comprises an electromechanical actuator situated on the steering column or on the lower assembly which comprises mechanical components intended to ensure the angular positioning of the steered wheels of the vehicle. The electromechanical actuator comprises a rotary electric motor the shaft of which is supported by at least one rolling bearing, either directly or via a ball-screw system. The rolling bearing generally comprises an inner ring, an outer ring, and a row of rolling elements, generally balls, arranged between the rings.

A retaining cage for a rolling bearing comprising a plurality of pockets to house the balls and each of which is defined in part by two claws arranged opposite a heel of the said cage is known, from document FR-A1-2 911 934. Such cages are entirely satisfactory in many applications. However, in applications involving a low rotational speed or in applications in which the direction of rotation reverses sharply, this kind of cage runs into various difficulties. Specifically, under the effect of the balls, the cage may suffer extensive deformation and come into contact with the inner ring, causing it to become damaged or even destroyed.

In addition, when the direction in which the load is applied to the rolling bearing changes, as it does for example when the wheels of a vehicle equipped with an electric power steering system as described above are turned as the driver maneuvers to the left or to the right when parking the vehicle, the cage is likewise severely deformed, or even destroyed.

A cage for a rolling bearing comprising first pockets provided with axial retention claws for the axial retention of the cage on the balls, and second pockets with no axial retention claws is also known, from document FR-A1-2 883 941.

In an application involving high axial and radial loads and low rotational speeds, for example speeds of between 100 and 300 rpm, the rolling bearing suffers extensive deformation. Such a cage does not offer the balls enough freedom relative to one another which means that the cage is also severely deformed if two adjacent balls move in opposite directions. This may cause the cage to be destroyed.

The present invention seeks to overcome these disadvantages.

SUMMARY OF THE PRESENT INVENTION

More specifically, the present invention seeks to provide a cage for a rolling bearing that offers good dependability.

The present invention also seeks to provide a cage that can be deformed with a limited risk of degradation.

The present invention also seeks to provide a cage of small bulk and limited weight and that is easy to fit.

In one embodiment, the cage for a rolling bearing, which cage is intended to ensure the circumferential spacing of a row of rolling elements, comprises pockets for the rolling elements and connecting portions each connecting two successive pockets. At least one of the said connecting portions is elastically deformable at least in the circumferential direction so as to allow the two associated pockets to move relative to one another in the said circumferential direction.

Advantageously, the said connecting portion comprises at least two elastic tabs joined together and forming a spring. The spring formed by the tabs may have at least one undulation. Each tab may comprise a connection part connected to the associated pocket and a joining part connected to the joining part of the other tab, the said joining parts being laterally offset with respect to the connection parts.

In one embodiment, the said connecting portion extends radially. Alternatively, the said connecting portion may extend axially or obliquely.

For preference, the said connecting portion delimits circumferentially between the two associated pockets, at least two notches situated laterally on each side of the said portion.

In one embodiment, each of the said connecting portions is elastically deformable at least in the circumferential direction.

The pockets may each have a wall of substantially constant thickness.

In one embodiment, the cage comprises first pockets for first rolling elements of the row, which pockets are provided with axial retention means for the axial retention of the cage on the said rolling elements, and second pockets for second rolling elements of the row, and which pockets have no axial retention means.

The cage may for example be made as a single piece from synthetic material, preferably polymer material.

According to a second aspect, the invention relates to a rolling bearing comprising an outer ring, an inner ring, at least one row of rolling elements arranged between the rings, and a cage as defined hereinabove.

According to a third aspect, the invention relates to a motor vehicle electric power steering comprising at least one rolling bearing as defined hereinabove.

BRIEF DESCRIPTION OF THE DRAWINGS

The present invention will be better understood from reading the detailed description of some embodiments which are given by way of entirely nonlimiting examples and illustrated by the attached drawings in which:

FIG. 1 is a perspective view of a rolling bearing cage according to a first embodiment of the invention;

FIG. 2 is a detailed view of FIG. 1;

FIG. 3 is a section on III-III of FIG. 2;

DETAILED DESCRIPTION OF THE PRESENT INVENTION

Figure 5:
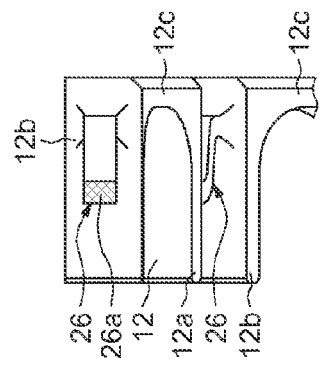
FIG. 5 is a section on V-V of FIG. 4.

FIG. 1 illustrates a cage 10 designed to be used in a rolling bearing of the type comprising an outer ring, an inner ring, and a plurality of rolling elements produced in the form of balls and mounted between the said rings. The cage 10 makes it possible to ensure an even circumferential spacing of the balls between the rings. The cage 10 may advantageously be produced as a single piece by moulding a polymer material, such as, for example, polyamide, notably PA 66 or PA 46, or alternatively a polyetheretherketone (PEEK).

The cage 10, of annular overall shape, comprises a plurality of pockets 12, 14 evenly distributed in the circumferential direction and designed to accept the balls, and joining or connecting portions 16 each joining two successive pockets together. As will be described in greater detail later, each connecting portion 16 is designed to allow the two adjacent associated pockets to move relative to one another in the circumferential direction.

Each pocket 12, 14 is open axially on just one side and open radially towards the inside and towards the outside so as to allow the cage 10 to be mounted and fitted over the balls. In the embodiment illustrated, the pockets 14 are provided with axial retention means for axially retaining the cage on the balls as will be described hereinafter, and the pockets 12 are not provided with such retention means. In this instance, there are eight pockets 12 arranged in pairs of immediately adjacent pockets. The pairs of pockets 12 are separated by a pocket 14. In this instance there are four pockets 14 evenly distributed in the circumferential direction to ensure even axial retention of the cage 10 on the balls.

As illustrated more visibly in FIGS. 2 and 3, each pocket 12 comprises two substantially cylindrical lateral walls 12a, 12b spaced apart in the circumferential direction, and a bottom wall 12c connecting the lateral walls 12a, 12b. The walls 12a, 12b and 12c have a constant thickness. The diameter of the cylinder defining the lateral walls 12a, 12b of each pocket 12 is greater than that of the balls so that the said balls can be offered some clearance in which to move radially and circumferentially with respect to the pockets 12. The lateral walls 12a, 12b are unable to provide axial retention of the cage on the balls. The pockets 12 are not provided with such axial retention means.

Each pocket 14 comprises a spherical wall 14a which tends to envelop the associated ball and forms a cup of constant thickness to accommodate the said ball. Each pocket 14 also comprises two opposing claws 14b, 14c each extending one end of the spherical wall 14a. The claw 14b extends in the circumferential direction towards the opposite claw 14c to delimit the associated pocket 14. The free ends of the claws 14b, 14c are spaced apart by a distance that is smaller than the diameter of the balls. The claws 14b, 14c of a pocket are capable of axially retaining the cage 10 by clipping onto the ball arranged in the said pocket.

In the embodiment illustrated, the connecting portions 16 are identical to one another and extend radially towards the outside of the cage between the pockets. Each connecting portion 16 is positioned circumferentially between two adjacent pockets. Each connecting portion 16 of the cage is configured to allow the two associated pockets relative movement in the circumferential direction. Each connecting portion 16 is flexible and elastically deformable in the circumferential direction to allow one pocket to move circumferentially relative to the other pocket.

Each connecting portion 16 is provided with a first elastic curved tab 16a extending radially towards the outside from the wall of the first associated pocket, and with a second elastic curved tab 16b extending the said first tab radially inwards and connecting to the wall of the second pocket. The first and second tabs 16a, 16b are flat, contiguous and flexible in the circumferential direction. The tabs 16a, 16b are symmetric with one another about a radial mid-plane of the connecting portion 16.

Each tab 16a, 16b comprises a connection part connected to the associated pocket and a joining part connected to the joining part of the other tab. The joining parts of the two tabs 16a, 16b are laterally, i.e. radially, offset towards the outside with respect to the connection parts connected to the two pockets. The connection parts of the tabs 16a, 16b are radially delimited by an interior surface that is aligned with the bore of the cage 10 and the joining parts of the said tabs are delimited radially by an exterior surface that is aligned with the exterior surface of the said cage. The tabs 16a, 16b form a spring able to apply a return force in the circumferential direction. The said spring comprises an undulation which in this instance is in the overall shape of a V in cross section.

Each connecting portion 16 connects either a pocket 12 and a pocket 14, or two pockets 12. For each connecting portion 16 connecting two pockets 12, the said connecting portion is connected circumferentially on each side to the lateral wall 12a or 12b of the associated pocket on the opposite side to the opening provided for the ball. For each connecting portion 16 connecting a pocket 12 and a pocket 14, the said connecting portion is connected firstly to the lateral wall 12b of the pocket 12 and secondly to the spherical wall 14a of the pocket 14 circumferentially on the opposite side to the opening defined by each pocket. For each connecting portion 16, the connection part of each tab is connected circumferentially to the wall of the associated pocket 12 or 14 circumferentially on the opposite side to the opening defined by the said pocket.

Each connecting portion 16 delimits a notch 18 that is open radially on the inner side of the cage and opens axially on each side of the said portion. The notch 18 passes axially through the thickness of the connecting portion 16. The notch 18 extends radially beyond the connection parts of the tabs 16a, 16b. The notch 18 is delimited in the circumferential direction by the tabs 16a, 16b and situated in the radial mid-plane of the connecting portion 16. Each connecting portion 16 also delimits two notches 20, 22 which open radially on the outer side of the cage and open axially on each side of the said portion. The notches 20, 22 pass axially through the thickness of the connecting portion 16. The notches 20, 22 are symmetric about the radial mid-plane of the connecting portion 16. Each notch 20, 22 extends radially inwards. The notch 20 is delimited in the circumferential direction by the tab 16a and the adjacent pocket, and the notch 22 is delimited in the circumferential direction by the tab 16b and the adjacent pocket.

In operation, if two balls housed in two adjacent pockets move in opposite directions, the connecting portion 16 connecting the two pockets can flex elastically in the circumferential direction to allow a relative circumferential movement of the balls and of the pockets, and can then return to its initial position when the balls are once again made to move in the same way. In operation, the connecting portions 16 are therefore able to deform, and this greatly reduces the risk of damage to the cage 10. The notches 18, 20 and 22 encourage the connecting portions 16 to deform in the circumferential direction. Moreover, these notches form recesses that lighten the cage 10 by reducing the amount of material used. The elasticity of each connecting portion 16 can be modified according to the thickness of the tabs 16a, 16b and/or according to the radial dimension of the notches 18 to 22 and/or according to the nature of the cage material.

Figure 4:
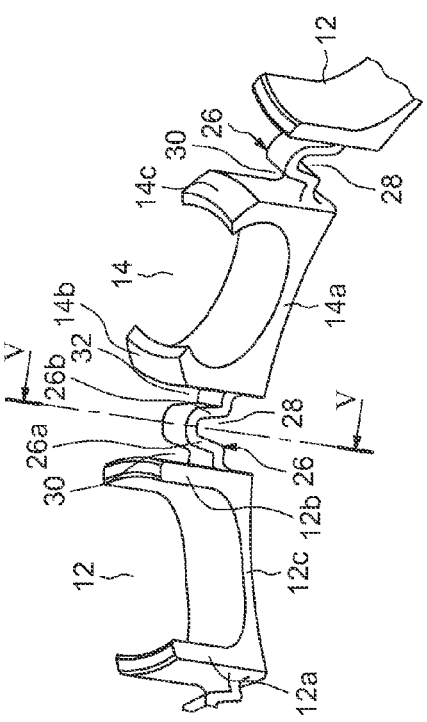
FIG. 4 is a detailed view of a cage according to a second embodiment of the invention.

In the embodiment illustrated, the connecting portions 16 of the cage extend radially towards the outside. As an alternative, it is possible to provide connecting portions that extend radially towards the inside of the cage. In another embodiment illustrated in FIGS. 4 and 5, in which identical elements bear the same references, the cage comprises connecting portions 26 of the same type as those previously described which are flexible and elastically deformable so as to allow the pockets 12, 14 relative movement in the circumferential direction.

In this embodiment, the connecting portions 26 differ only in terms of their orientation and their reduced thickness. The connecting portions 26 here extend axially between the pockets 12, 14. Each connecting portion 26 is each provided with a first elastic curved tab 26a extending from the wall of the first associated pocket axially on the same side as the opening of the said pocket, and with a second elastic curved tab 26b extending the said first tab axially on the opposite side and connecting to the wall of the second associated pocket. The joining parts of the tabs 26a, 26b are axially offset towards the outside with respect to the connection parts connected to the pockets. The first and second tabs 26a, 26b are symmetric with one another about an axial mid-plane of the connecting portion 16. The tabs 26a, 26b form a circumferential spring comprising an undulation which in cross section has the overall shape of a U.

Each connecting portion 26 delimits a notch 28 open axially on the opposite side to the pockets 12, 14 and opens radially on each side of the said portion. The notch 28 is delimited in the circumferential direction by the tabs 26a, 26b and is situated in the axial mid-plane of the connecting portion 16. Each connecting portion 16 further delimits two notches 30, 32 which are open axially on the same side as the pockets 12, 14 and open radially on each side of the said portion. The notches 30, 32 are symmetric about the axial mid-plane of the connecting portion 16. The notch 30 is delimited in the circumferential direction by the tab 26a and the immediately adjacent pocket and the notch 32 is delimited in the circumferential direction by the tab 26b and the immediately adjacent pocket.

Figure 7:
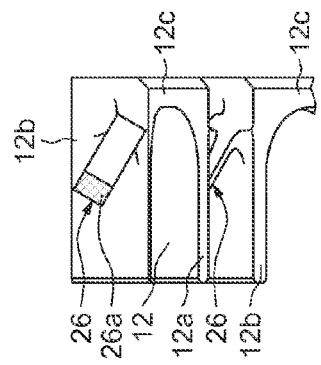
FIG. 7 is a section on VII-VII of FIG. 6.
Figure 6:
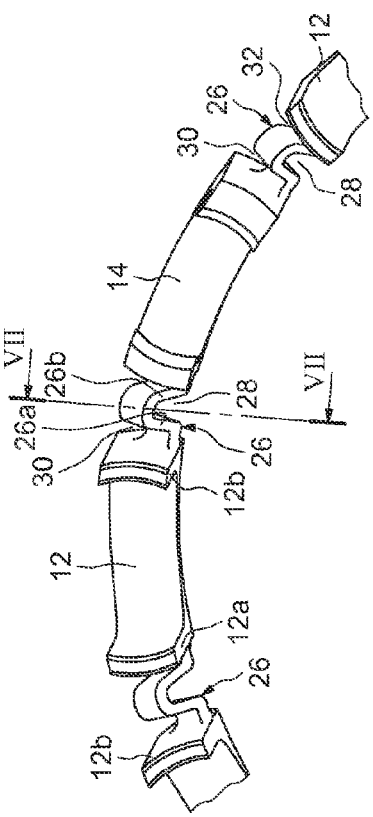
FIG. 6 is a detailed view of a cage according to a third embodiment of the invention.

In this embodiment illustrated, the connecting portions 26 of the cage extend axially towards the outside on the same side as the openings of the pockets 12, 14. As an alternative, it is possible to provide connecting portions that extend axially towards the inside. In another embodiment illustrated in FIGS. 6 and 7, in which identical elements bear the same references, the connecting portions 26 of the cage extend obliquely towards the outside of the cage. As an alternative, it might even be possible to provide connecting portions extending obliquely towards the inside of the cage.

In all of the embodiments illustrated, each flexible connecting portion comprises a pair of tabs forming a circumferential spring. As an alternative, it might be possible, for one or for each connecting portion, to provide a higher number of pairs of tabs so as to obtain a spring comprising a plurality of undulations, thus increasing the ability of the cage to deform in the circumferential direction. In another alternative form of embodiment, it might also be possible to provide a cage comprising both connecting portions that are deformable and connecting portions that are not deformable in the circumferential direction.

In all of the embodiments illustrated, the various connecting portions extend either radially or axially or obliquely. As an alternative, it might be possible to combine in one and the same cage the various connecting portions illustrated. It might for example be possible to provide a cage comprising first connecting portions extending radially and second connecting portions extending axially or obliquely, or a cage comprising first connecting portions extending axially and second connecting portions extending obliquely, or alternatively a cage comprising first connecting portions extending radially, second connecting portions extending axially and third connecting portions extending obliquely.

In the embodiments illustrated, the cage comprises pockets provided with axial retention means and pockets which have no such retention means. As an alternative, the cage could comprise just one type of pockets. In another alternative form of embodiment, it might even be possible to provide a cage that allows the circumferential spacing of other types of rolling elements, for example rollers.

By virtue of the invention, the pockets that house the rolling elements are able to move relative to one another in the circumferential direction. Thus, the risk of the cage becoming damaged if two adjacent rolling elements move in opposite directions is greatly reduced insofar as these rolling elements are able to move relative to one another in the circumferential direction.

The invention claimed is:

1. A cage for a rolling bearing, comprising:
the cage being formed of a polymer and being adapted to circumferentially space a row of rolling elements, the cage defining a plurality of pockets for the row of rolling elements and also defining a plurality of connecting portions, each of the plurality of connecting portions connecting two associated successive pockets, wherein at least one of the plurality of connecting portions is elastically deformable at least in a circumferential direction so as to allow the two associated successive pockets to move relative to one another in the circumferential direction during operation of the rolling bearing,
each of the plurality of pockets having first and second portions that each extend from a base portion thereof and each form a free end, the first and second portions being spaced in the circumferential direction, each of the plurality of connecting portions are connected to the first portion of one of the two associated successive pockets and is also connected to the second portion of the other of the two associated successive pockets, the at least one of the plurality of connecting portions attaches to a location of each of the first and second portions that is between the free end and the base portion such that the at least one connecting portion does not attach or extend from the free end of the first and second portions, each of the plurality of connecting portions forms a V-shape in cross section, and wherein a first longitudinal axis of each one of the plurality of connecting portions is not parallel to a second longitudinal axis of the first portion and is not parallel to a third longitudinal axis of the second portion of the two associated successive pockets.

2. The cage according to claim 1, in which each of the plurality of connecting portions comprises at least two elastic tabs joined together and forming a spring.

3. The cage according to claim 2, the spring further comprising at least one undulation.

4. The cage according to claim 2, each of the at least two elastic tabs further comprising a connection part connected to a respective one of the plurality of pockets and a joining part, each joining part of the at least two elastic tabs connected together, the joining part being laterally offset with respect to the connection part.

5. The cage according to claim 1, in which the first longitudinal axis of the plurality of connecting portions extend one of radially, axially, or obliquely.

6. The cage according to claim 1, wherein each of the plurality of connecting portions delimit circumferentially between the two associated successive pockets, at least two notches situated laterally on each side of each of the plurality of connecting portions.

7. The cage according to claim 1, wherein each of the plurality of connecting portions is elastically deformable at least in the circumferential direction.

8. The cage according to claim 1, wherein the first portion, the second portion, and the base portion of each of the plurality of pockets have a constant thickness.

9. The cage according to claim 1, comprising first pockets for first rolling elements of the row of rolling elements, which are provided with an axial retention feature for the axial retention of the cage on the first rolling elements, and second pockets for second rolling elements of the row of rolling elements, the second pockets having no axial retention feature.

10. The cage according to claim 1, wherein at least a portion of each of the plurality of connecting portions has a first thickness as measured in a radial direction that is less than a second thickness of the first and second portions of the plurality of pockets as measured in the radial direction.

11. A rolling bearing comprising:
  an inner ring;
  an outer ring;
  at least one row of rolling elements arranged between the rings; and
  a cage, the cage being formed of a polymer and being adapted to circumferentially space the at least one row of rolling elements, the cage defining a plurality of pockets for the at least one row of rolling elements and also defining a plurality of connecting portions, each of the plurality of connecting portions connecting two associated successive pockets,
  wherein at least one of the plurality of connecting portions is elastically deformable at least in a circumferential direction so as to allow the two associated successive pockets to move relative to one another in the circumferential direction during operation of the rolling bearing,
  each of the plurality of pockets having first and second portions that each extend from a base portion thereof and each form a free end, the first and second portions being spaced in the circumferential direction, each of the plurality of connecting portions are connected to the first portion of one of the two associated successive pockets and is also connected to the second portion of the other of the two associated successive pockets, the at least one of the plurality of connecting portions attaches to a location of each of the first and second portions that is between the free end and the base portion such that the at least one connecting portion does not attach or extend from the free end of the first and second portions, each of the plurality of connecting portions forms a V-shape in cross section, and wherein a first longitudinal axis of each one of the plurality of connecting portions is not parallel to a second longitudinal axis of the first portion and is not parallel to a third longitudinal axis of the second portion of the two associated successive pockets.

12. A motor vehicle electric power steering comprising at least one rolling bearing, each rolling bearing comprising:
  an inner ring;
  an outer ring;
  at least one row of rolling elements arranged between the rings; and
  a cage, the cage being formed of a polymer and being adapted to circumferentially space the at least one row of rolling elements, the cage defining a plurality of pockets for the at least one row of rolling elements and also defining a plurality of connecting portions, each of the plurality of connecting portions connecting two associated successive pockets,
  wherein at least one of the plurality of connecting portions is elastically deformable at least in circumferential direction so as to allow the two associated successive pockets to move relative to one another in the circumferential direction during operation of the rolling bearing,
  each of the plurality of pockets having first and second portions that each extend from a base portion thereof and each form a free end, the first and second portions being spaced in the circumferential direction, each of the plurality of connecting portions are connected to the first portion of one of the two associated successive pockets and is also connected to the second portion of the other of the two associated successive pockets, the at least one of the plurality of connecting portions attaches to a location of each of the first and second portions that is between the free end and the base portion such that the at least one connecting portion does not attach or extend from the free end of the first and second portions, each of the plurality of connecting portions forms a V-shape in cross section, and wherein a first longitudinal axis of each one of the plurality of connecting portions is not parallel to a second longitudinal axis of the first portion and is not parallel to a third longitudinal axis of the second portion of the two associated successive pockets,
  wherein the at least one rolling bearing is installed with the motor vehicle.

\* \* \* \* \*